(12) United States Patent
Spiegel et al.

(10) Patent No.: US 6,614,709 B2
(45) Date of Patent: Sep. 2, 2003

(54) METHOD AND APPARATUS FOR PROCESSING COMMANDS IN A QUEUE COUPLED TO A SYSTEM OR MEMORY

(75) Inventors: Christopher Spiegel, El Dorado Hills, CA (US); Chris McAllen, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 09/803,229

(22) Filed: Mar. 9, 2001

(65) Prior Publication Data

US 2002/0126541 A1 Sep. 12, 2002

(51) Int. Cl.[7] .................................................. G11C 7/00
(52) U.S. Cl. ........................ 365/230.01; 365/230.09
(58) Field of Search ...................... 365/230.01, 230.09; 709/223, 304

(56) References Cited

U.S. PATENT DOCUMENTS 6,026,439 A * 2/2000 Chowdhury et al. ........ 709/223

OTHER PUBLICATIONS

U.S. patent application Ser. No. 09/063954, See et al., Apr. 21, 1998.

* cited by examiner

*Primary Examiner*—Vu A. Le
(74) *Attorney, Agent, or Firm*—Blakely, Sokoloff, Taylor & Zafman LLP

(57) ABSTRACT

A queue, either in software or hardware, with a plurality of layers with each layer having a plurality of locations. The queue receives a command, and compares the command with the pending commands in the queue to determine if the command should be processed, and, if the command should be processed then store the command in one of the plurality of locations in one of the plurality of layers; and forward the command to a system or a memory in response to a priority.

20 Claims, 3 Drawing Sheets

METHOD AND APPARATUS FOR PROCESSING COMMANDS IN A QUEUE COUPLED TO A SYSTEM OR MEMORY

BACKGROUND OF THE INVENTION

1. Field of the Invention

The present invention relates generally to a queue, and more specifically to an efficient operation of processing commands to a system or a memory.

2. Description of the Related Art

The demand for quicker and more powerful communication devices has led to many technological advances, including flash memory and the ability to store and retain data despite the loss of power. A non-volatile memory has the ability to retain the data despite loss of power and is one of the enabling technologies for the wireless and cellular revolution.

The three basic operations of a non-volatile memory are read, erase, and write commands. A read command is a query to the memory to read a data value at a specific address within the memory. The memory retrieves the data value for a received address of the query. In contrast, a write command requests the memory to store a data value in a specific address within the memory. The memory receives an address and data value, and stores the data value at the specific address. An erase command is an efficient means for deleting an entire segment or block of the non-volatile memory. Also, commands to a flash media system can include write, delete, and read files.

However, flash memory lacks symmetry for processing read, erase, and program commands. Presently, a read command or command is performed in approximately 90 nanoseconds. In contrast, a write command or command is typically performed in 7000–8000 nanoseconds. Thus, a program command is much slower and impacts the performance of a system utilizing flash memory. Also, program commands are faster than erase commands which are approximately 1 second.

A flash media is a system with various configurations of flash memory devices to create a non-volatile storage. One example is a system with a 32 bit bus and multiple 8 bit flash memory devices coupled to the 32 bit bus. Also, flash media could be hardware with additional decoding logic to manage and coordinate the various array of flash memory devices. Thus, the flash media exhibits the same flash memory device read, program, and erase characteristics. A flash media could be coupled to a file system, which has the interface and logic to manage files and directories. Thus, the interface with the file system allows for the ability to create, delete, move, read, write, and flush files and create, get, delete, read, flush, and write directories.

Commands are stored in a queue until they are processed by a microprocessor or memory. A typical queue is a first in first out (FIFO) that processes commands in the order the command is received. A FIFO minimizes design complexity but lacks flexibility and cannot process commands out of order. Simply, a FIFO processes the commands in the order they are received. Also, a priority queue allows for the ability to process commands in response to a priority. However, the current priority queues lack the ability for processing interdependent commands that are pending in the queue and lack the ability to synchronize pending data in the queue with data in the system.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

A method and apparatus for storing and forwarding commands in a queue coupled to a system are described. In the following description, for purposes of explanation, numerous details are set forth in order to provide a thorough understanding of the present invention. However, it will be apparent to one skilled in the art that these specific details are not required in order to practice the present invention.

Figure 1:
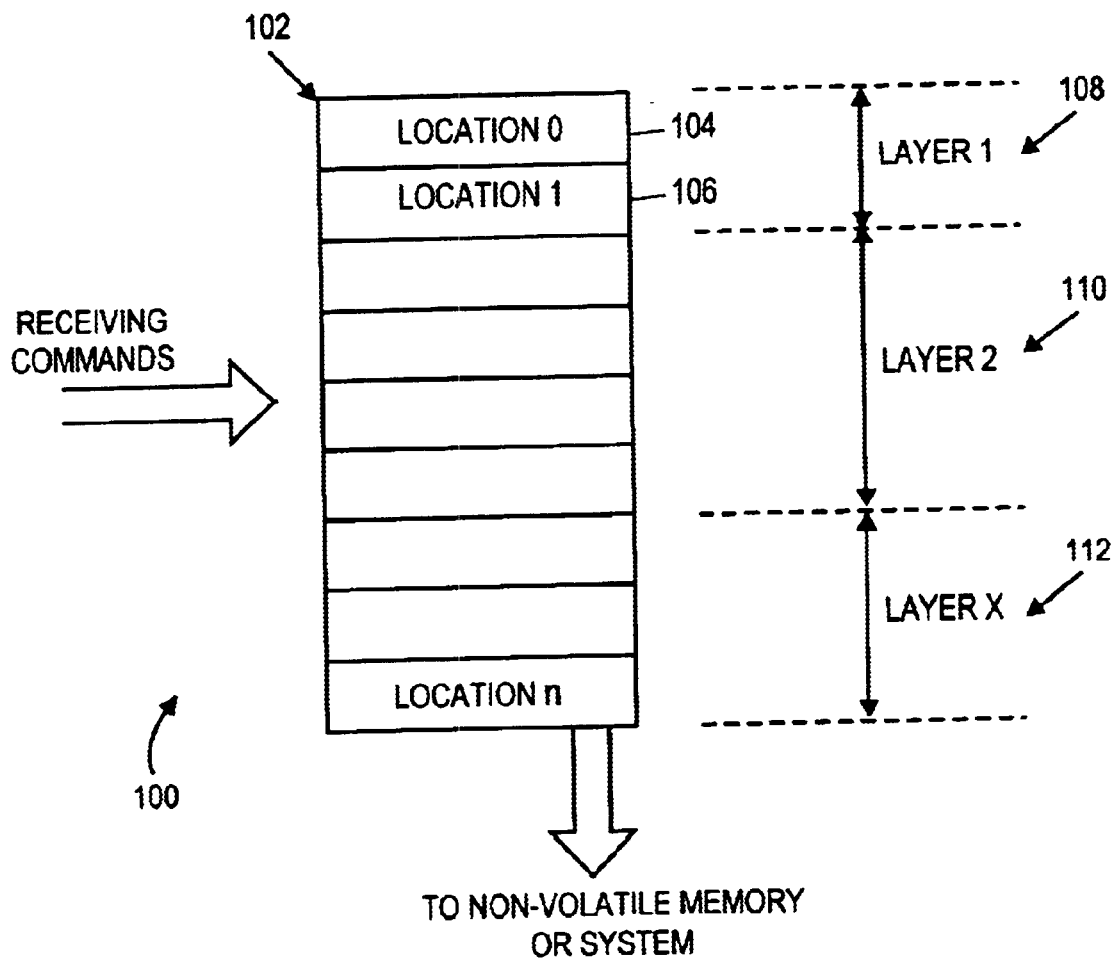
FIG. 1 shows a circuit in accordance with the present invention.

FIG. 1 illustrates a queue 100 in accordance with the present invention. Queue 100 receives commands from a microprocessor, memory controller, software, or a microcontroller. In one embodiment, the queue 100 is implemented in hardware and is coupled to a flash media and file system. In another embodiment, the queue 100 is implemented in software. In one embodiment, the commands include create, delete, move, read, write, and flush files commands and create, get, delete, read, flush, and write directory commands. The queue comprises a plurality of locations such as 104, 106 capable of storing the received commands. In one embodiment, the queue is organized into a plurality of layers 108, 110, and 112.

The plurality of layers each contains various locations to store the commands. Therefore, the queue 100 is organized into a plurality of layers 108, 110, 112, with each layer having a plurality of locations to store the received commands. In one embodiment, there are two layers, the first layer designated for file commands, and the second layer designated for directory commands. In another embodiment there are three layers: the first layer designated for create, delete, read and move file and directory commands; the second layer designated for flush file and flush directory commands; and third layer designated for write file and write directory commands. A flush is a request to have the entire pending write commands completed due to the termination of a memory transaction such as closing a memory page. This insures data integrity and completes the execution of pending write commands.

Upon receiving a command, in one embodiment the command is stored in the queue based on the priority of the command. For example, in one embodiment the highest priority is assigned to create, delete, read and move file and directory commands, mid priority is assigned to flush file and flush directory commands, and the lowest priority to write file and write directory commands. Also, the new command is analyzed to allow for interaction with the pending commands in the queue to allow for efficient operation. For example, if the new command is a read file or read directory command, the queue analyzes the pending commands to determine if there are any pending write file or directory commands which can affect the data integrity of the read command. Another example is if the new command is a delete directory, the queue interacts with the pending commands to determine if there are any write commands to the same directory. The write commands are moot since the directory is to be deleted, thus, the queue deletes the pending write commands to the directory to be deleted. Yet another example is if the new command is a flush file or flush directory command, the pending write commands are elevated in priority and are moved to a higher priority layer. This improves system performance because the write commands have to be processed before the flush command, and by increasing the priority of the pending write commands, the flush command can also be processed more efficiently. Therefore, as illustrated in the preceding three examples the queue allows for interaction of the new command with the pending commands to improve the performance of the overall file system.

In one embodiment, the commands are forwarded to the flash media in response to a priority hierarchy based on the layers. The first layer is designated as the highest priority and stores the following commands: create, delete, read and move file and directory commands; the second layer stores the flush file and directory commands; and third layer stores the write file and directory commands. In one embodiment, the commands in the first layer are forwarded to the flash media. After the commands in the first layer are sent and received by the flash media, the flush commands from the second layer 110 are forwarded to the flash media. Similarly, after the commands in the second layer are sent and received by the flash media, the write commands from the third layer 110 are forwarded to the flash media.

In another embodiment, the layers store read, write and erase commands. The queue forwards the commands to a non-volatile memory.

In yet another embodiment, there are no layers and the commands are forwarded to the non-volatile memory or a flash media in response to the type of command. For example, if a system designer assigns a higher priority to a directory command and a low priority to a write file command, then the commands for directory command are forwarded to the non-volatile memory from the queue before the write commands are forwarded.

The queue 100 increases design flexibility and performance by allowing the commands to be processed based on the priority of the command and has the ability to interact new commands with pending commands to efficiently process the pending commands. Also, the queue allows for synchronizing pending data in the queue with data stored in the flash media For example, a new read command and a pending write command request the same portion of a file within a flash media system. A synchronization of the system is needed to insure the write command is processed first to insure the integrity of the data for the read command.

Those skilled in the art will further appreciate utilizing various embodiments of different numbers of layers, different types of commands, and assigning different priorities to each layer. A system designer could assign priority levels in response to the particular characteristics of the flash media. Also, there could be different priorities within each layer of the queue. Also, each layer could contain different numbers of storage locations. For example, layer 108 can contain more locations than layer 110 or layer 112. Thus, the queue can process asymmetrically sized layers.

Figure 2:
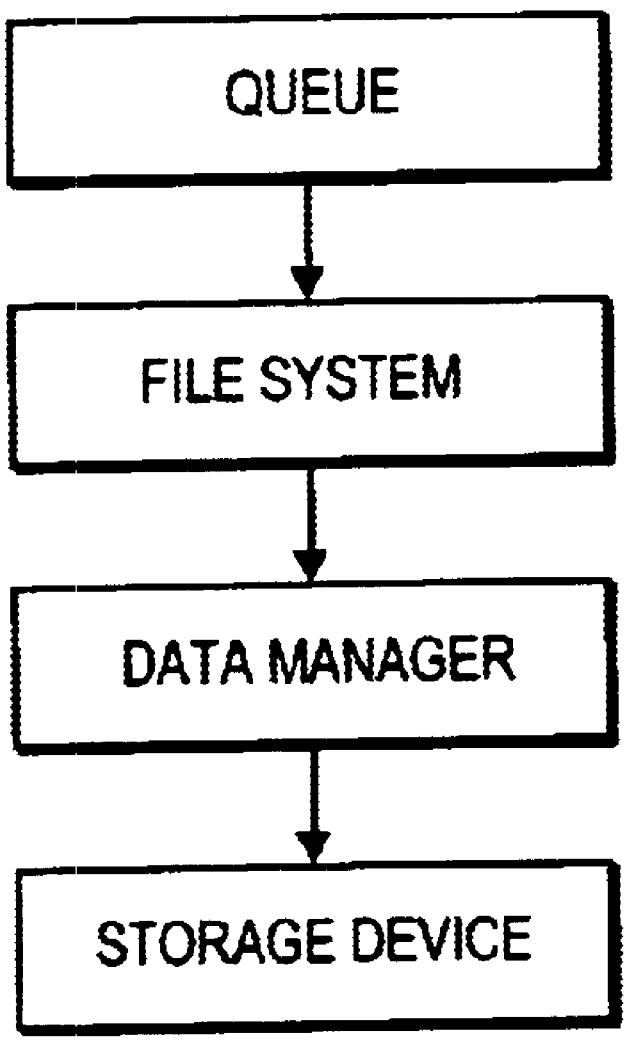
FIG. 2 shows a flowchart in accordance with the present invention.

FIG. 2 illustrates a flowchart in accordance with the present invention. The flowchart 200 is a software stack and illustrates a data flow protocol between the queue, file system, data manager and a non-volatile memory device. In one embodiment, the queue is implemented in software by a machine-readable medium includes a mechanism that stores information in a form readable by a computer such as a read only memory (ROM); random access memory (RAM); optical storage media; electrical, or optical form of propagated signals.

The software implementation of the queue allows for communication with the file system. The queue receives commands from the file system. Also, the queue transmits commands to the file system in response to a priority hierarchy. The data manager is coupled to the non-volatile memory devices. The data manager processes the various file and directory commands, and the non-volatile memory devices processes the write and read commands.

In one embodiment, the software implementation of the queue is utilized by the Intel® Persistent Storage Manager (IPSM)™. IPSM is an installable file system for the Windows CE® operating system. In another embodiment the software implementation of the queue is utilized by Intel's® Flash Data Integrator (FDI) or Strataflash. The invention is not limited to the use in the preceding embodiments, rather, they are just multiple embodiments of the invention. In yet another embodiment, the queue is a hardware implementation.

Figure 3:
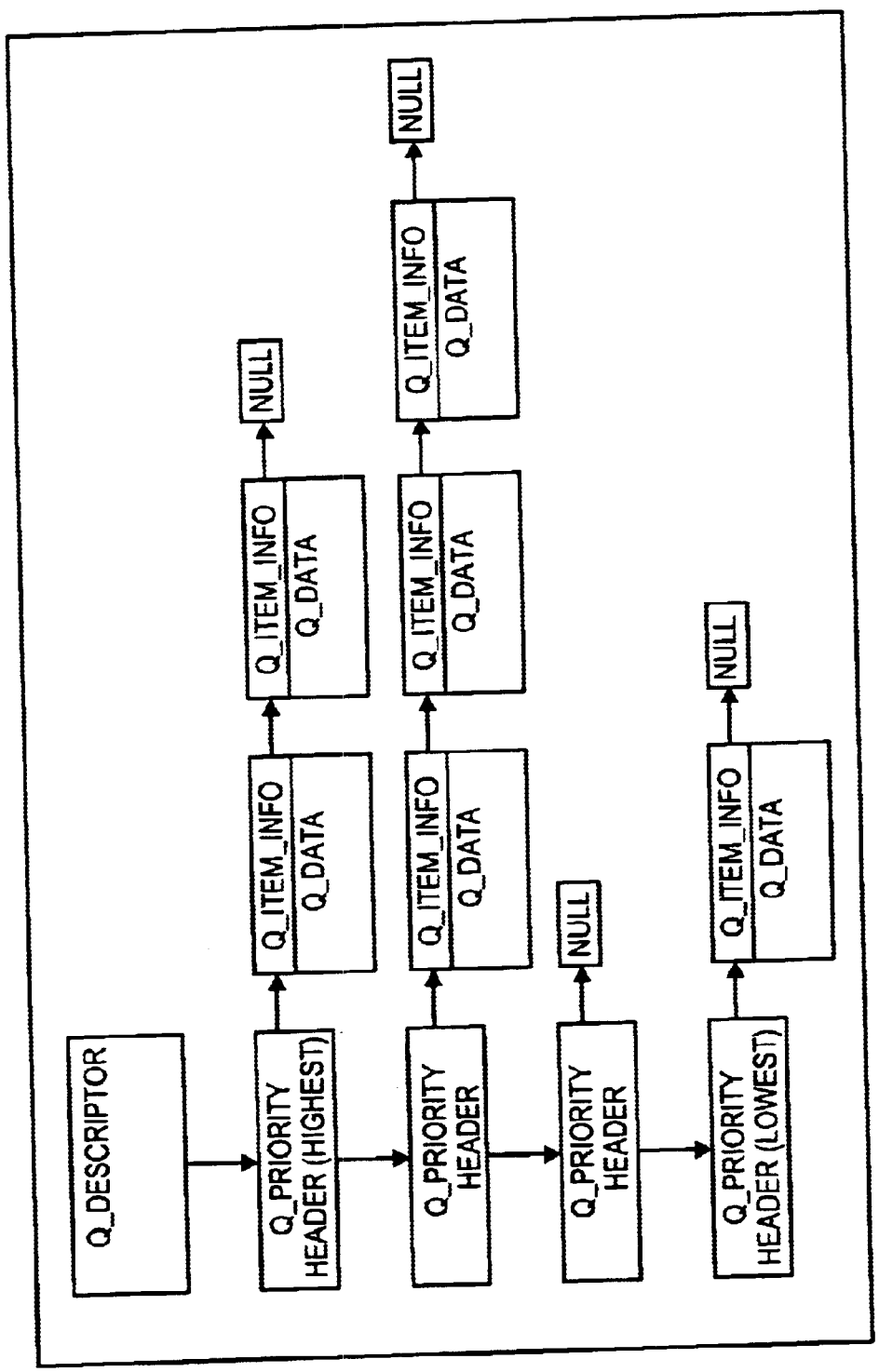
FIG. 3 shows a priority hierarchy of one embodiment in accordance with the present invention.

FIG. 3 illustrates an embodiment of the present invention. FIG. 3 is one embodiment of a priority hierarchy implemented in software. For example, each Q_PriorityHEADER is assigned a relative priority level. Within each Priority header are individual data items designated as Q_DATA. The data items are then processed in the priority assigned to their respective Priority Headers.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is contemplated, therefore, that such modifications can be made without departing from the spirit or scope of the present invention as defined in the appended claims.

What is claimed is:

1. An article of manufacture comprising:

a storage medium having stored thereon instructions, that, when executed by a computing platform, result in execution of:

receiving a command;

creating the queue with a plurality of layers, the plurality of layers comprise a plurality of locations;

comparing the command with a plurality of pending commands in the queue to determine if the command should be processed, and, if the command should be processed then storing the command in one of the plurality of locations in one of the plurality of layers; and forwarding the command to a system or a memory in response to a priority.

2. The article of manufacture of claim 1 wherein the system is a flash media.

3. The article of manufacture of claim 1 wherein the command is a directory or file command for a file system.

4. The article of manufacture of claim 1 wherein the command is a write, erase, or read command for a non-volatile memory.

5. The article of manufacture of claim 1 wherein priority is determined by the type of command.

6. The article of manufacture of claim 1 wherein priority is determined by a characteristic of the flash media.

7. The article of claim 4 wherein the priority for write command is lower than the priority for the directory command.

8. The article of claim 1 wherein the memory is a non volatile memory.

9. An apparatus comprising:

a non-volatile memory; and a queue, coupled to the non-volatile memory, to receive a command and compare the command with the pending commands in the queue and to determine if the command should be processed, and to store the command if the command should be processed, the queue comprising:
- a first and second layer, the first and second layer each comprising a plurality of locations to store at least one command in response to a status.

10. The apparatus of claim 9 wherein the queue further comprises a third layer.

11. The apparatus of claim 9 wherein the non-volatile memory is a flash memory.

12. The apparatus of claim 9 wherein the plurality of commands are write commands, erase commands, and program commands.

13. The apparatus of claim 9 wherein the status is a priority level assigned to a type of command.

14. The apparatus of claim 9 wherein the status is a priority level assigned to a characteristic of a flash media coupled to the non-volatile memory.

15. A method for forwarding a first command in a queue for a system comprising:
- receiving the first command;
- comparing the first command with at least one of the pending commands in the queue to determine if the first command should be processed;
- storing the first command, if the first command should be processed, into the queue comprising a plurality of locations to store the command;
- forwarding the first command to the system.

16. The method of claim 15 wherein comparing the first command comprises deleting pending commands in the queue which are invalid due to the first command.

17. The method of claim 15 wherein forwarding the first command to the system comprises prioritizing the commands in response to a type of command.

18. The method of claim 15 wherein the commands are directory or file commands for a file system.

19. The method of claim 15 wherein the system is a flash media.

20. The method of claim 18 wherein the priority for the file command is higher than the priority for the directory command.

* * * * *